Feb. 24, 1970  H. W. STEIN  3,497,129
METHOD OF PRODUCING PATTERNED-SURFACE SHEET
MATERIAL AND BAGS MADE THEREFROM
Filed Oct. 18, 1965  3 Sheets-Sheet 2

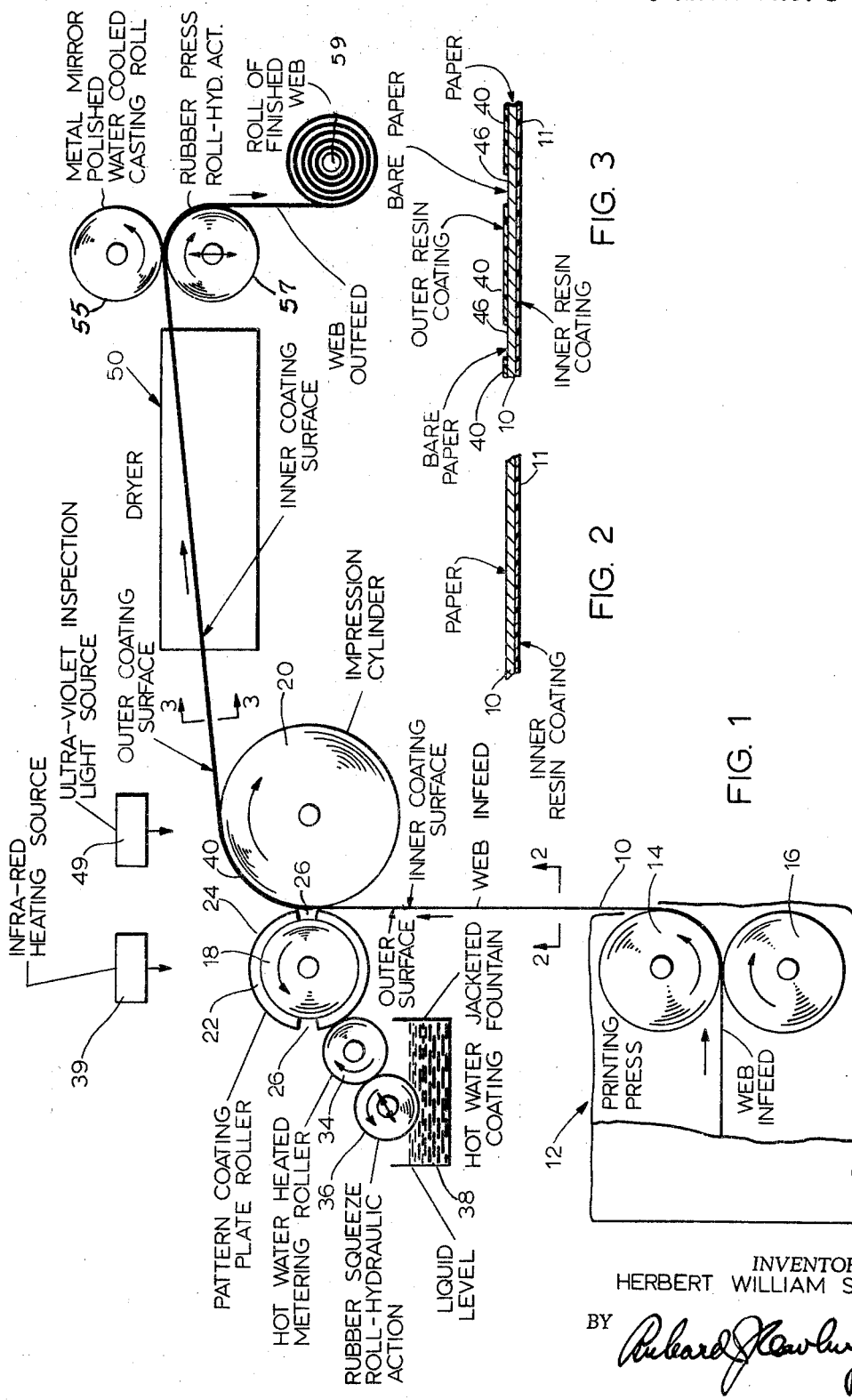

INVENTOR.
HERBERT WILLIAM STEIN
BY
ATTORNEY

Feb. 24, 1970          H. W. STEIN          3,497,129
METHOD OF PRODUCING PATTERNED-SURFACE SHEET
MATERIAL AND BAGS MADE THEREFROM
Filed Oct. 18, 1965          3 Sheets-Sheet 3

INVENTOR.
HERBERT WILLIAM STEIN
BY
ATTORNEY 3,497,129
METHOD OF PRODUCING PATTERNED-SURFACE SHEET MATERIAL AND BAGS MADE THEREFROM
Herbert William Stein, Hillsdale, N.J., assignor to Oneida Paper Products, Inc., Clifton, N.J., a corporation of Delaware
Filed Oct. 18, 1965, Ser. No. 496,830
Int. Cl. B65d *31/02*
U.S. Cl. 229—53
5 Claims

ABSTRACT OF THE DISCLOSURE

A sheet material, for use in forming a heat sealable bag, is made by a method and means by which a sheet of paper having a coating of a heat sealable material on and coextensive with one surface is coated on its other surface with a heat sealable material in a predetermined pattern so as to provide uncoated marginal and transverse areas on said other surface. The uncoated areas constitute outer back, top and bottom seam portions of bags that are made from the thus coated sheet material.

---

This invention relates to a novel method and apparatus for producing a patterned-surface sheet material and bag made therefrom, and more particularly to a novel rotary plate and method for coating a surface on one side of a sheet material, such as paper, with a predetermined pattern of a heat sealable material, which pattern provides a marginal surface extending along one edge of the sheet material and other marginal surfaces in the sheet material extending transversely of the first mentioned edgewise marginal surface, with all of the marginal surfaces being bare of such heat sealable material, while the surface at the other side of the sheet material is completely coated with the heat sealable material. The marginal surfaces are so arranged that a bag may be formed from the sheet material by subsequent cutting and folding steps in such a manner that the marginal surfaces bare of the heat sealable material along one side of the sheet material may have applied thereto suitable heat sealing elements to cause the coating of the heat sealable material on the inner or opposite surface of the sheet material to adhere to an adjacent opposite coated surface of the sheet material to effectively seal the bag.

Heretofore, in the packaging of food and other commodities in heat sealable bags, it has been found that in the use of the prior sheet material of a type having both sides completely coated with a heat sealable material, such as a suitable thermoplastic resin or lacquer material, the heat sealing elements, when applied to such a coated surface, would become gummed with an accumulation of resultant melted resin or lacquer, thereby requiring the sealing operation to be frequently stopped so as to permit the heat sealing elements to be removed or cleaned of the accumulation thereon of the melted heat sealable material.

An object of the invention is to provide a novel method of producing a sheet of paper material for use in forming heat sealable bags in which a surface thereof has been coated with heat sealable material in a predetermined pattern, leaving clear and uncoated marginal surface areas to be provided on the outer surface of the bag and adjacent the seams of the bag so that the heating elements have an uncoated area over which to travel or apply heat in effecting the sealing of the opposite or inner completely coated surfaces of the adjacent sheet material of the bag, thereby serves to avoid any undesirable "pick-off" of the heat sealable material by the heating elements which might otherwise result in a loss of production and time in the shut down of operation to permit cleaning of the heating elements.

A further object of the invention is the provision of a roll consisting of a continuous strip of a sheet material completely coated on one side with a heat sealable coating while the other surface of the sheet material is covered with the coating in a pattern which provides an uncoated marginal surface area along one edge and a series of longitudinally spaced uncoated parallel surface areas extending inwardly therefrom to within a short distance of its opposite edge, whereby the roll may be cut transversely along the median axes of said transversely and inwardly extending uncoated areas to form sheets that may be made into individual bags.

While it is well known in the prior art to completely coat the opposite surfaces of a sheet material with a suitable heat sealable material in order that subsequent cutting and folding operations may bring opposite coated areas into a desired relationship to form a sealable bag or receptacle, an object of the present invention is to provide a novel rotary pattern plate for coating a surface on one side of the sheet material in a predetermined pattern of the heat sealable material in which the normally completely coated surface is uncoated in selected areas adjacent seams of the bag and to accommodate a heat sealing member in the subsequent sealing of the bag or receptacle so as to avoid a buildup or accumulation of the melted heat sealable material on the heat sealing member.

Another object of the invention is to provide a sheet material for use in forming a sealable bag having an uncoated transverse strip extending across a surface of the sheet material coated with a heat sealable material, the uncoated strip overlying an opposite surface of the sheet material completely coated with such heat sealable material so that the sheet material may be cut along this uncoated strip and folded to form a bag in such a manner that a heat sealing member may be applied across the uncoated strip to effect the sealing of the bag while being precluded from picking up any of the coating material.

A further object of the invention is the provision of a bag of a sheet material completely coated over the inner surface thereof with a heat sealable coating while the outer surface of the sheet material of the bag is coated with the coating in a pattern which provides uncoated marginal surface areas immediately adjacent the back, bottom and top seams of the sheet material of the bag so that heated sealing elements may be pressed along the uncoated outer marginal surfaces of the bag to cause the heat sealable lacquer on the inner surface of the sheet material to effectively seal the bag along the back, bottom and top seams thereof with practically no "pick-off" of the coating by the heat sealing elements.

Other and further objects and advantages of the invention reside in the detailed arrangement of patterned surface material, which result in simplicity, economy and efficiency, and which will be apparent from the following description, wherein preferred embodiments are shown and described, reference being had to the accompanying drawings, forming a part hereof, wherein like numerals indicate like parts. It is to be understood, however, that the drawings are for the purpose of illustration only and are not a definition of the limits of the invention, reference being had to the appended claims for this purpose.

In the drawings:

FIGURE 1 is a diagrammatic view of a machine for producing the novel patterned-surface web or sheet material for forming the roll or sealed bag, and showing the several steps used in the method of applying the pattern of the heat sealable material to the web in accordance with the principles of the invention;

FIGURE 2 is an enlarged cross sectional view of the web infeed of FIGURE 1 taken substantially along the lines 2—2 thereof, looking in the direction of the arrows, and showing the web portion with an inner surface coating of a suitable heat sealable material immediately preceding the application of a novel outer surface coating by the novel pattern coating plate roll of the present invention;

FIGURE 3 is an enlarged longitudinal sectional view of a portion of the web outfeed of FIGURE 1, taken substantially along the line 3—3 thereof, looking in the direction of the arrows, and showing the web portion with the inner surface coating and an outer surface coating in a novel predetermined pattern of a suitable heat sealable material applied by the novel pattern coating plate roll;

Figure 4:
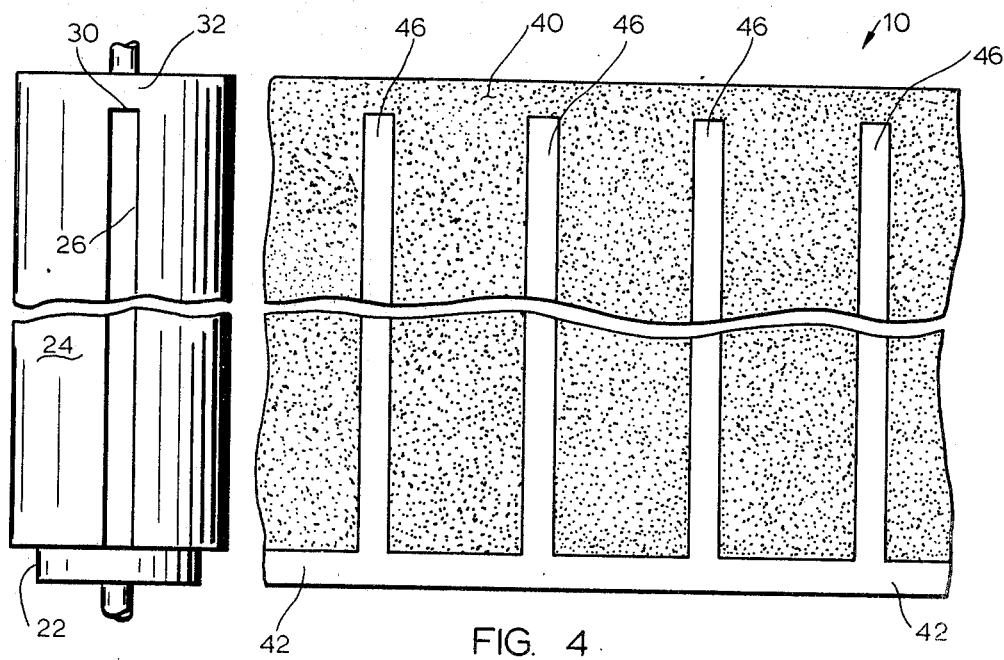
Figure 5:
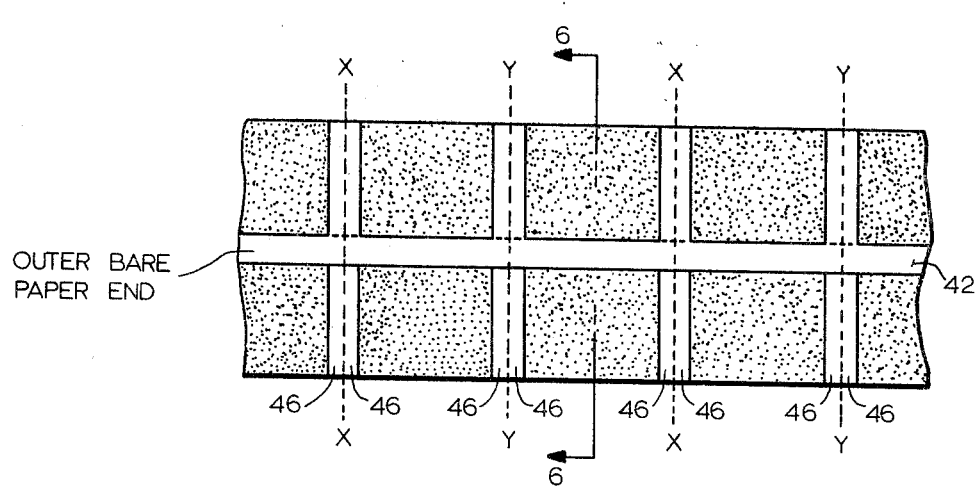
Figure 6:
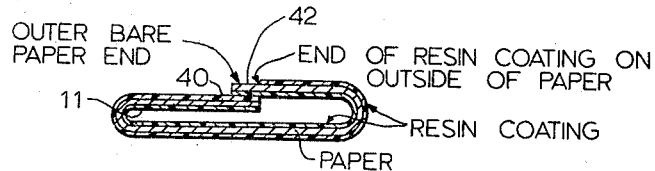
Figure 7:
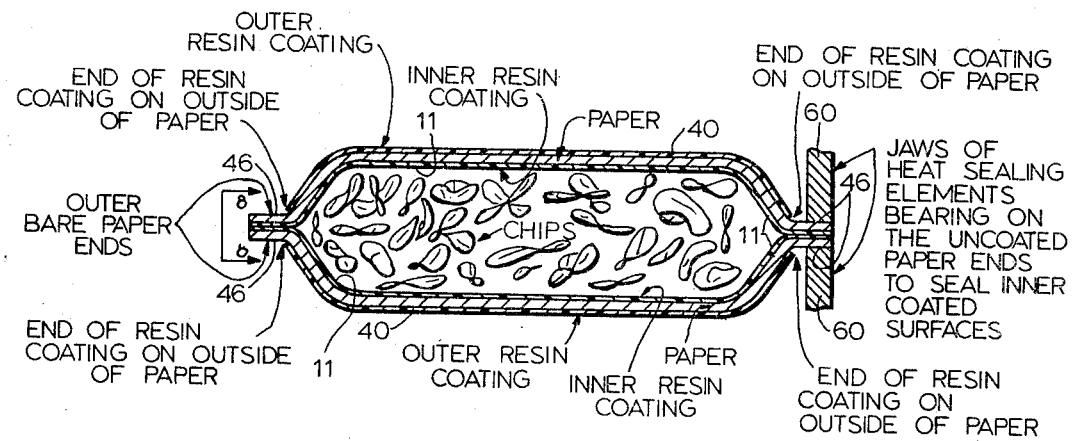
Figure 8:
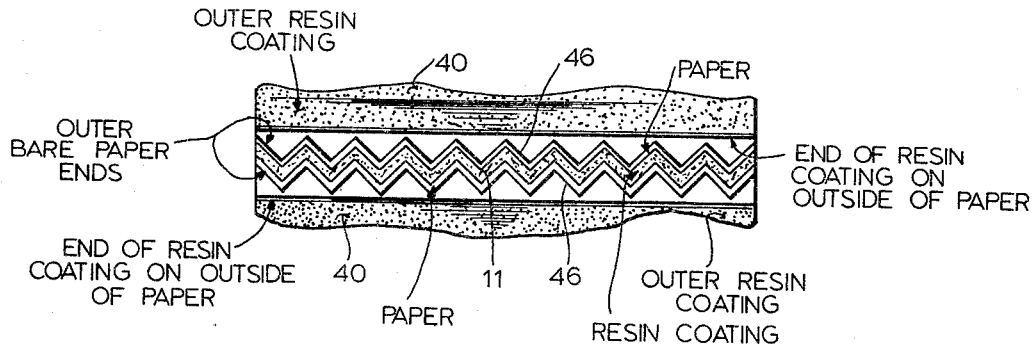

FIGURE 4 is an enlarged top plan view of fragmentary portions of the novel pattern coating plate roll shown in cooperative relation to fragmentary portions of the web outfeed and the application to the web of the novel outer coating pattern of heat sealable coating material in which has been shown the marginal surface extending along one edge of the web and the other marginal surfaces extending transversely and edgewise of said marginal surface, all of which marginal surfaces are bare of the heat sealable coating material;

FIGURE 5 shows the sheet material or web of FIGURE 4 folded into a tube with the outer bare edgewise marginal surface thereof extending immediately over a coated opposite outer edgewise surface of the web so that an inner coated surface of the web at the opposite side from the bare edgewise surface may be sealed to the outer coated edgewise surface of the web;

FIGURE 6 is a sectional view of FIGURE 5 taken substantially along the lines 6—6 thereof, looking in the direction of the arrows and showing the sealing relation between the opposite edgewise marginal surfaces of the web;

FIGURE 7 is an enlarged longitudinal sectional view of a sealed bag formed of a portion of the folded tubular web of FIGURE 5, which had been severed therefrom along lines X—X and Y—Y and with opposite end portions thereof sealed by the application of heat sealing elements to portions of the outer bare marginal surfaces extending along the edges at the opposite ends of the bag; and FIGURE 8 is a fragmentary end view of the bag shown in FIGURE 7, the same having been taken substantially along the line 8—8 thereof, looking in the direction of the arrows, and showing one form of crimping seal that may be applied by the sealing elements shown in FIGURE 7.

Referring now to the drawings and particularly to FIGURE 1, there is shown a web or sheet material, such as paper, indicated generally by the numeral 10. The web or sheet material 10 has applied over one side thereof by conventional means a coating of a heat sealable material. The coating material may be any conventional thermo plastic resin or lacquer, having a low melting point of between 180 degrees F. and 250 degrees F., and which may or may not have moisture impervious properties.

Referring now to FIGURE 2, it will be apparent that the web infeed has one side completely covered with such an inner thermo plastic coating 11, while the opposite or outer side of the sheet material is bare of any coating. Such web infeed is drawn through a conventional printing press 12 by the action of the rollers 14 and 16, which are driven by suitable motor means (not shown). The printing press applies to the bare outer surface of the web or sheet material 10 suitable indicia and markings as may be desired.

The web infeed 10 is then drawn from the printing press 12 and between a rotatable pattern coating plate roller 18 and a rotatable impression cylinder 20. The pattern coating plate roller 18, as shown by FIGURES 1 and 4, includes an annular recessed portion 22 at one end thereof and an annular raised portion 24 in which there is provided at opposite sides thereof channels 26 which open into the annular recessed portion 22 and are closed at an opposite end 30 by a portion 32 of the annular raised portion 24.

The annular raised portion 24 of the pattern coating plate roller 18 is arranged in a contacting cooperating relation with a water heated metering roller 34 which is in turn arranged in contacting cooperating relation with a suitable conventional hydraulic action rubber squeeze roller 36.

The roller 18, cylinder 20 and rollers 34 and 36 are rotatably driven by suitable motor means (not shown) in the directions indicated by the arrows. The arrangement is such that the surface portion of the roller 36 is immersed in a hot water jacketed coating reservoir or fountain 38 containing a float controlled supply of a conventional liquid thermo plastic heat sealable resin or lacquer coating material. The liquid coating material is picked up by the rotation of the roller 36 and transferred thereby to the metering roller 34 which, in turn, by the rotation thereof supplies the same to the annular surface of the raised portion 24 of the rotatable pattern coating plate 18.

The thermoplastic material is maintained in a liquid state on the annular raised portion 24 of the roller 18 by providing a suitable infra-red heating source 39, as shown by FIGURE 1, to maintain the annular portion 24 at a sufficiently high temperature. Thus, the annular raised portion 24 of the roller 18 upon rotation may apply the liquid thermoplastic coating material at 40 on the outer coating surface of the web or sheet material 10, as shown by FIGURE 3, and by the stippled portion 40 of FIGURE 4.

However, since the liquid coating material is not applied by the annular recessed portion 22 or by the channels 26, it may be seen that corresponding portions 42 and 46 on the outer surface of the web 10 remain uncoated and bare, as shown in FIGURE 4.

The pattern of the heat sealable coating material applied at 40 on the outer surface of the web 10, as shown in FIGURE 1, includes the bare marginal surface 42 extending along one edge of the web or sheet material 10 and the other longitudinally spaced bare marginal surfaces 46 extending transverse the edgewise marginal surface 42, as shown by FIGURE 4. These bare marginal surfaces 46 do not extend fully across the heat sealable material 40 to the opposite edge of sheet material 10, but instead are limited by the heat sealable material extending along the opposite edge of the web or sheet material 10, as shown by FIGURE 4.

The thermoplastic coating 40 may have therein a suitable ultraviolet ray dye so that there may be provided in a conventional manner an ultraviolet ray inspection light source 49, as shown by FIGURE 1, so that an inspection may be continuously made of the pattern of the thermoplastic material 40 applied at the outer surface of the web 10 to assure complete and the proper application of the pattern.

The web or sheet material 10, in having the outer resin or lacquer coating 40 applied thereto by the novel pattern coating plate roller 18, is drawn between the roller 18 and cylinder 20 upon the rotation thereof by suitable motor means (not shown). The web 10 is thereafter passed through a dryer 50 which may be of a conventional type to fix, dry and set the pattern of the heat sealable material 40 on the outer surface of the web or sheet material 10. Suitable rollers 55 and 57 are rotatably driven by suitable motor means (not shown), in the directions indicated by the arrows so as to draw the web 10 therethrough in polishing the opposite surfaces thereof in a conventional manner.

Upon the completion of the application to the web or sheet material 10 of the outer resin coating 40, as shown by FIGURE 3, in the pattern, as shown by FIGURE 4, the sheet material 10 is then ready to be rolled for storage and shipment on a mandrel 59, or to be fed into a standard tube former of a conventional type such as shown and described in U.S. Patent No. 3,003,402 granted Oct. 10, 1961 to Sam Stein. In the tube former, the side edges of the sheet material or paper strip 10 are brought into a superimposed position substantially to form a tube with the bare edgewise outer marginal surface 42 of the paper strip 10 extending immediately over an opposite outer edgewise surface of the strip 10 coated as at 40 with the heat sealable coating material so that an inner surface of the strip 10, coated as at 11 with the heat sealable coating material at the opposite side from the bare edgewise surface 42, may be sealed to the outer edgewise surface of the strip 10, as best shown in FIGURES 5 and 6.

In effecting the heat sealing operation, a conventional suitable flat heated ironing element (not shown) may be applied to the bare edgewise outer marginal surface 42 covering the back seam and travel thereover in effecting the sealing of the inner contiguous surfaces of the sheet material or paper strip which have been coated with the heat sealable material at 11 and 40. Manifestly, with the heated ironing element traveling over the bare strip 42, there will be no undesirable "pick-off" of the heat sealable material by said heated sealing element.

Thereafter the tube, as shown by FIGURE 5, passes through a conventional type cutter mechanism, as described in the aforenoted U.S. Patent No. 3,003,402, which cuts the tube into individual bag sections along the lines X—X and Y—Y. The individual sections are then carried into a conventional bag sealing mechanism.

In the bag seal mechanism, one end of the sections or the bottom end sections of the bag are first crimped and sealed together by applying the saw-toothed jaws of suitable heat sealing elements 60 along the outer end surfaces 46, which provide an uncoated area over which to apply heat to effect the crimping and sealing of the opposite or inner completely coated surfaces 11 of adjacent sheet material of the bag, as best shown by FIGURE 7.

The bag may then have the interior thereof filled by the operation of a suitable machine of conventional type with a commodity to be sealed therein, and the opposite or top end of the bag is then sealed together in like manner by the application of the jaws of the heated sealing elements 60 bearing on the uncoated paper end surfaces 46 to effectively crimp and seal the inner surfaces 11 coated with the heat sealable material, as shown by FIGURE 7.

It will be seen that in the foregoing sealing operation by the provision of the uncoated marginal surface areas 42 and 46 immediately adjacent the back, top and bottom seams of the sheet material of the bag, the heat sealing elements may be pressed along the uncoated outer marginal surfaces 42 and 46 of the bag to cause the heat sealable resin or lacquer coating on the inner surface 11 of the sheet material 10 to effectively seal the bag along the back, bottom and top seams thereof with practically no "pick-off" of the lacquer or resin coating by the heat sealing elements.

The invention thus serves to avoid the heretofore disadvantage in the prior art of an undesirable "pick-off" of the heat sealable coating material by the heating elements passing directly over a surface coated with such material, thereby causing the heating elements to become gummed with an accumulation of resultant melted coating material requiring the sealing operation to be frequently stopped so as to permit the heat sealing elements to be removed or cleaned of the accumulated material thereon. Such frequent stopping of the sealing machine for the removal of the heating elements and cleaning has resulted in a great loss of production and operating time.

What I claim is:

1. In a method of making a sheet material for use in forming a heat sealable bag in which an inner surface of the sheet material for the bag has been completely coated with a heat sealable material: the steps comprising coating an outer surface of the sheet material for the bag with a heat sealable material, providing a first bare marginal area at an outer surface of the sheet material extending along a side edge thereof, providing a second bare marginal area at an outer surface of the sheet material extending along an edge of the sheet material at one end thereof, and providing a third bare marginal area at an outer surface of the sheet material extending along an edge of the sheet material at an opposite end thereof.

2. A method of making a sheet material for use in forming a heat sealable bag in which an inner surface of the sheet material for the bag has been completely coated with a heat sealable material: said method comprising coating an outer surface of the sheet material for the bag with a heat sealable material in a predetermined pattern, and providing in said pattern a plurality of uncoated marginal areas on said outer surface extending along edges of the sheet material to be positioned adjacent the back, bottom and top seams of the bag so that a heated ironing element may be applied along the uncoated marginal areas in effecting the sealing of the bag at said seams without a "pick-off" of the heat sealable material by the heated ironing element.

3. A sealable bag comprising a sheet material completely coated over an inner surface with a heat sealable coating material, said sheet material having an outer surface coated with a heat sealable coating material in a predetermined pattern so as to provide outer uncoated marginal surface areas immediately adjacent back, bottom and top seams of the sheet material of the bag so that a heated sealing element may be pressed along the outer uncoated surface areas to cause the heat sealable coating material on the inner surface of the sheet material to effectively seal the bag along the back, bottom and top seams thereof without an accumulation of melted coating material on the sealing element.

4. A sealable bag comprising a sheet material completely coated over an inner surface with a heat sealable thermoplastic material, said sheet material having edges providing back, bottom and top seams for the sheet material of the bag, said sheet material having an outer surface coated with a heat sealable thermoplastic material in a predetermined pattern so as to provide a first outer bare marginal surface area extending along one of the edges of the back seam of the bag, and other outer bare marginal surface areas extending transversely of the first marginal surface area and along the respective edges of the bottom and top seams of the bag.

5. A roll of heat sealable sheet material comprising a sheet of material for making heat sealable bags of substantial length as compared to its width dimensions completely coated over an inner surface with a heat sealable coating, said sheet material having an outer surface coated with a heat sealable coating in a predetermined pattern so as to provide an outer uncoated marginal surface area along one side edge and a series of longitudinally spaced uncoated areas extending from said uncoated marginal side edge transversely of said sheet of material to a point short of its opposite edge, whereby when said sheet of material is folded into a tube and sealed along its longitudinally extending uncoated area said transversely extending uncoated areas form a complete band about said tube, whereupon said tube may be cut intermediate said transversely extending bands to form relatively short individual tubes having an uncoated outer area contiguous with its opposite ends that may be sealed with heated sealing irons without accumulating the melted coating material thereon.

References Cited

UNITED STATES PATENTS

| | | | |
|---|---|---|---|
| 3,050,185 | 8/1962 | Crain | 206—59 |
| 3,044,369 | 7/1962 | Ross | 93—35 |
| 3,209,983 | 10/1965 | Bellezanne | 229—53 |

DAVID M. BOCKENEK, Primary Examiner

U.S. Cl. X.R.

93—35; 117—37; 206—56; 229—55